United States Patent
Salonen

[15] 3,693,254
[45] Sept. 26, 1972

[54] MOTORIZED SHEARING IMPLEMENT

[72] Inventor: Albert R. Salonen, 560 Baxter Avenue, Victoria, British Columbia, Canada

[22] Filed: Feb. 5, 1971

[21] Appl. No.: 112,926

[30]   Foreign Application Priority Data

Aug. 26, 1970   Canada.....................091570

[52] U.S. Cl.................................................30/228
[51] Int. Cl. ...........................................B26b 15/00
[58] Field of Search...............30/180, 192, 228, 247; 222/146 HE, 390

[56]   References Cited

UNITED STATES PATENTS

| | | | |
|---|---|---|---|
| 3,052,980 | 9/1962 | Fieser | 30/228 |
| 3,178,816 | 4/1965 | Schmid | 30/228 |
| 3,213,605 | 10/1965 | Welden | 30/228 X |
| 3,550,815 | 12/1970 | Salonen | 222/146 HE |

*Primary Examiner*—Robert C. Riordon
*Assistant Examiner*—J. C. Peters
*Attorney*—Albert R. Salonen

[57]   ABSTRACT

This invention relates to a portable, hand-held shearing implement, which includes a pair of cutting blades employing a motor powered mechanism to apply the cutting force. The invention is particularly adaptable for an implement to execute individual, deliberate, cutting strokes. One version may be powered by an electric motor or a self-contained internal combustion engine, driving through a gear reduction train to a reciprocatory mechanism having threaded means with a releasable coupling to drive the power stroke. Another version employs a controllable reversing switch to effect the reciprocative action and is limited to an electric motor drive. In the former version, reopening of the blades is spring actuated with provision included to soften the impact of termination, and includes a triggering means to stop and hold the reciprocative action after each cycle until released by trigger actuation.

17 Claims, 20 Drawing Figures

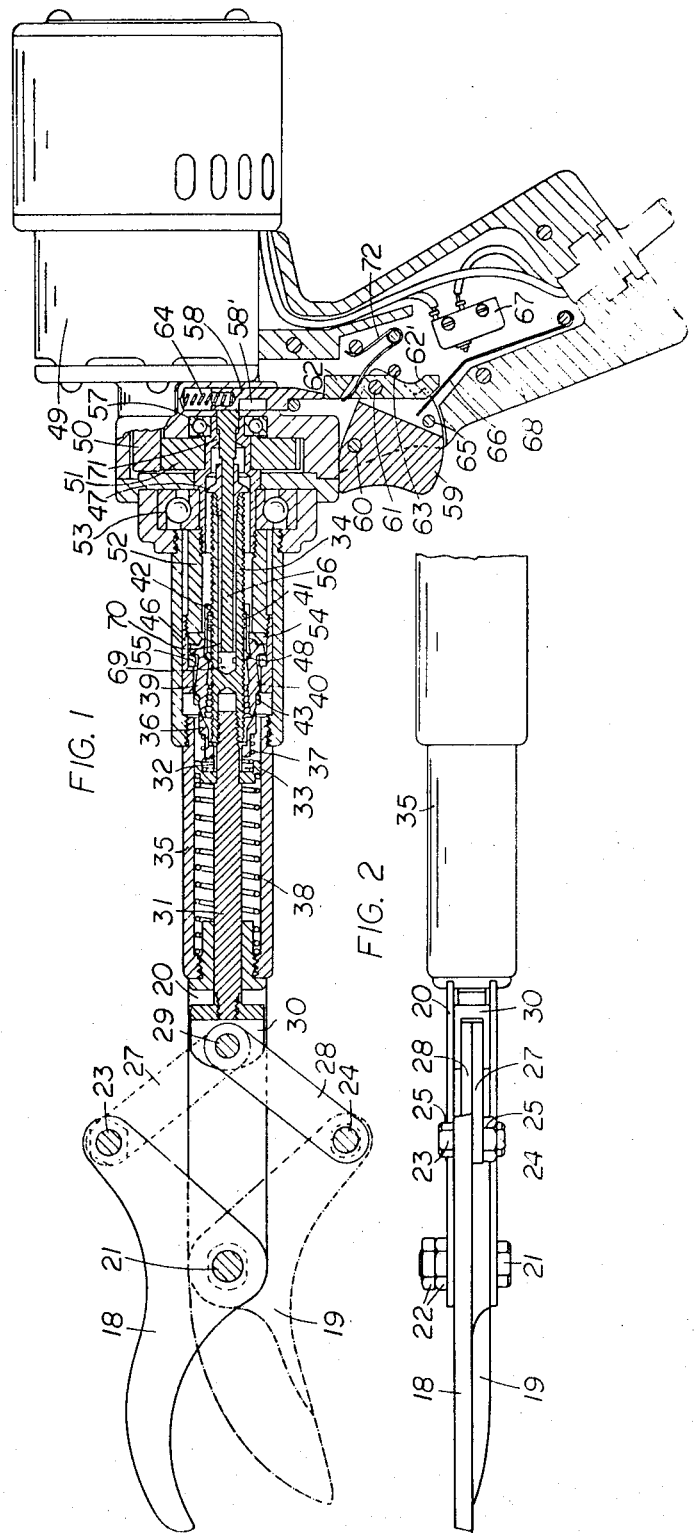

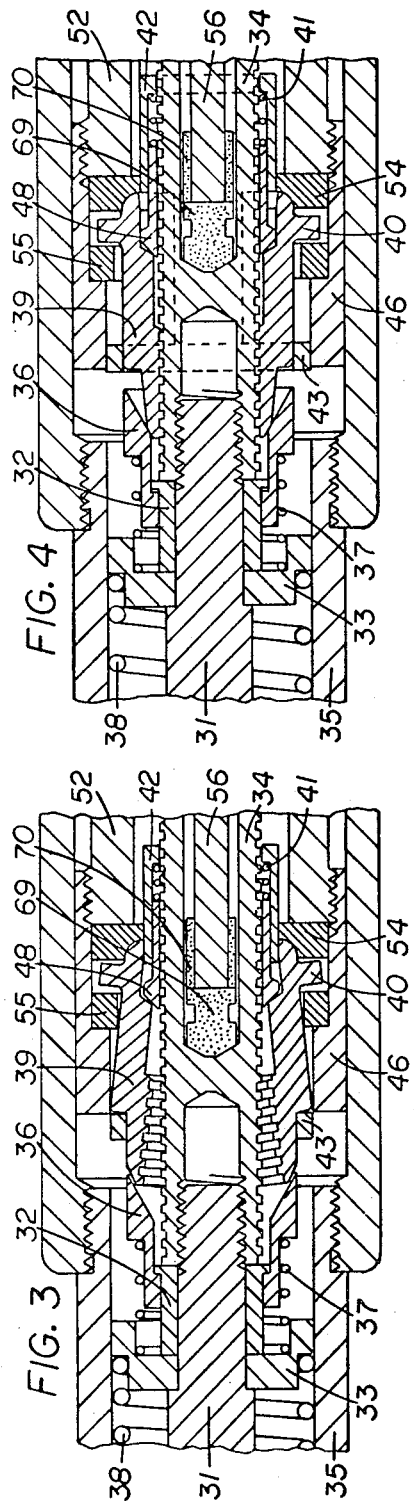

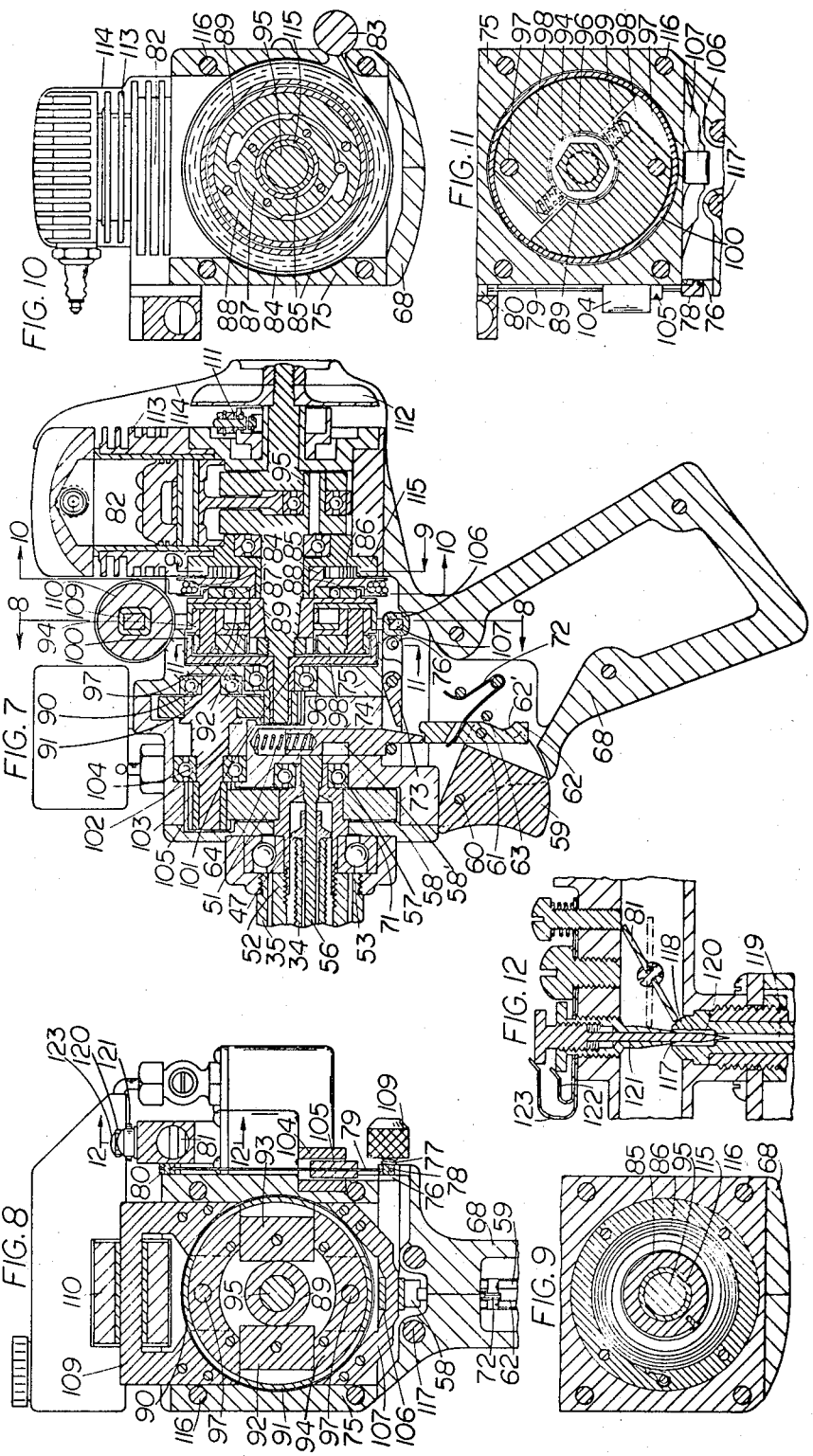

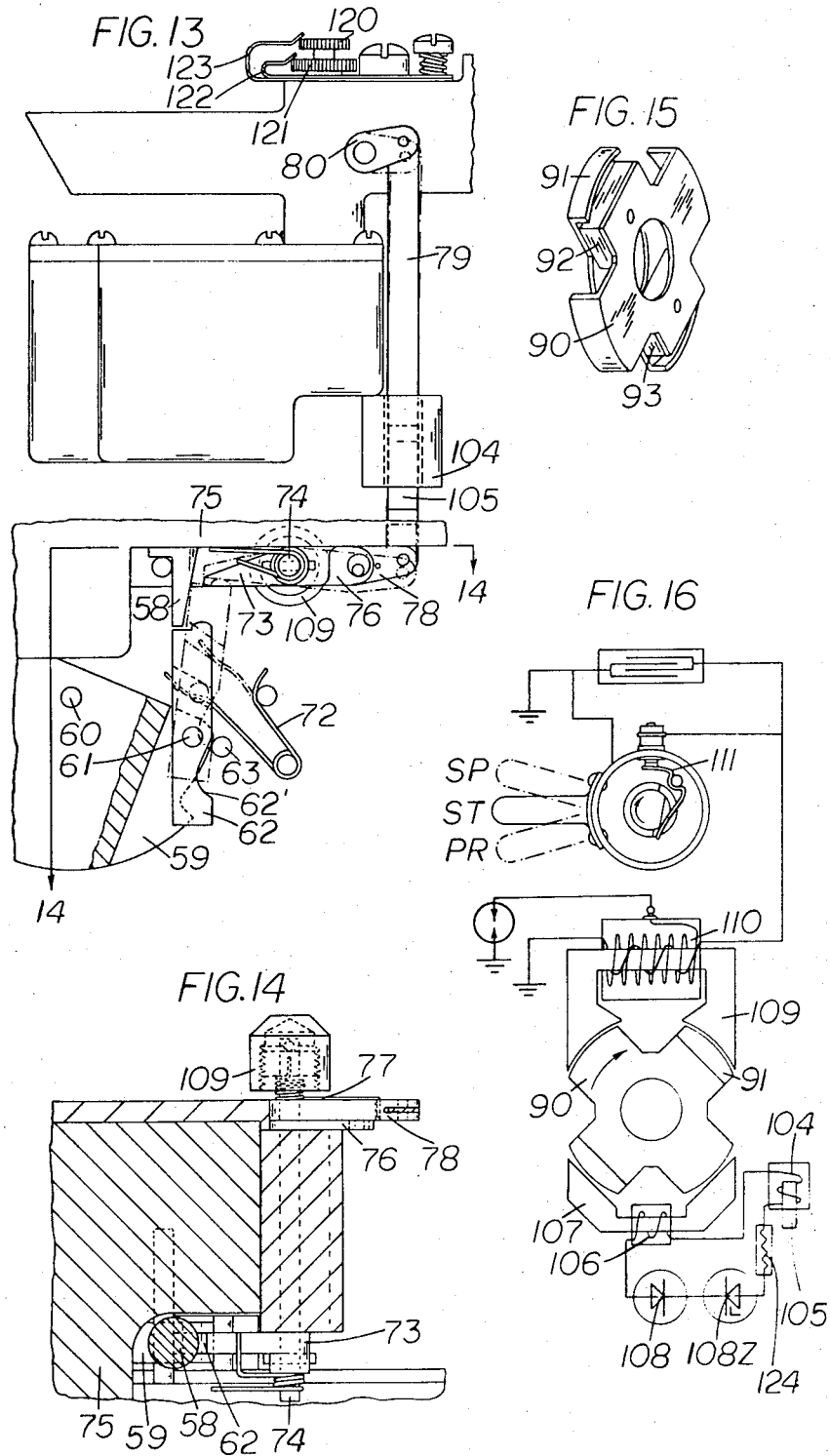

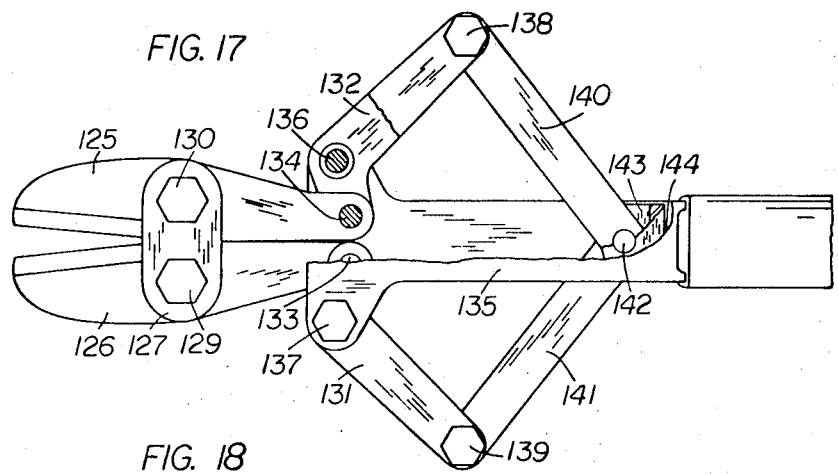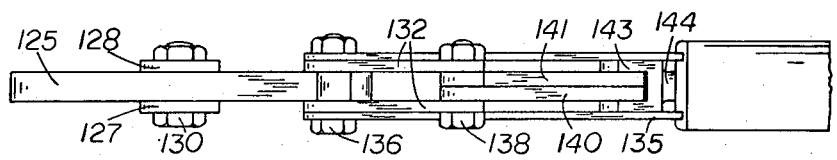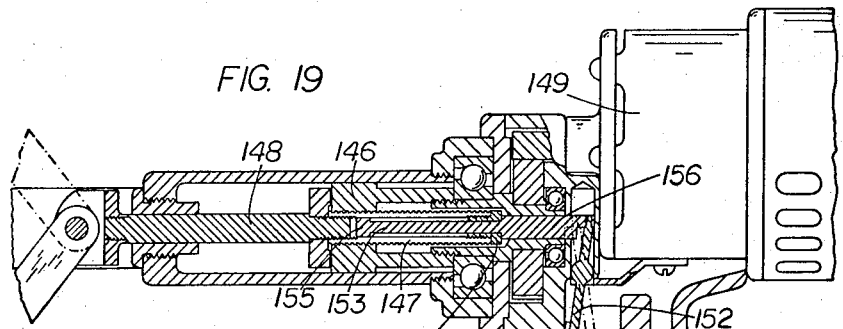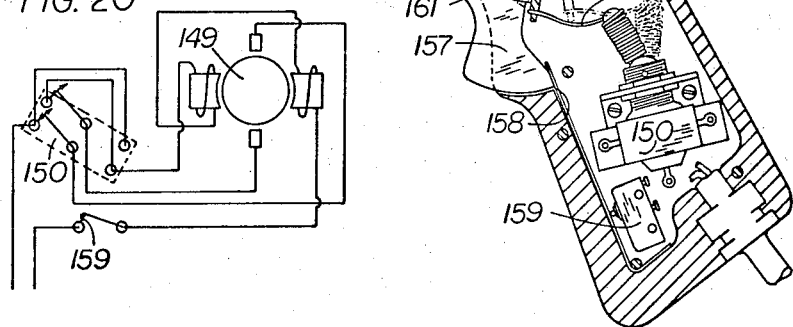

MOTORIZED SHEARING IMPLEMENT

This invention relates to a motorized force-mechanism, adaptable to operate through an actuating means to a pair of cutting blades arranged as a shear. More particularly it relates to a portable, light-weight, hand-held, motor-driven shearing tool having two variations in its basic form: one being dependent on an electrical power supply for the motive power; the other utilizing a self-contained internal combustion engine.

The task of pruning trees, trimming bushes and cutting cane usually is accomplished with manually powered tools. These implements, if a shearing action is involved, require the application of considerable muscular effort. In the building industry, when on site cutting of steel reinforcing bars is done, a large manually powered pair of snips, usually is employed.

The operation of manually powered implements, particularly when near maximum effort is required, is best accomplished with the operator's arms and hands close in or near the chest, however, a favorable physical stance or location is often difficult and in some instances impossible to achieve — thus seriously hampering their effectiveness. An implement, capable of performing the above tasks, and which derives its motive power from means other than that of the operator, would eliminate this problem and would be more economical of time expended.

The transference of motive power to shearing blades can be accomplished by various techniques, for example: a mechanism which employs a fluid to transfer the pressure from a motor driven pump to a piston in a cylinder, thence to a pair of cutting blades is one; another is a cam or eccentric crank, gear driven by the motor means and coupled to actuate the cutting blades. Other possibilities may be obvious. However, for maximum convenience of manipulation in such applications as tree pruning, the force-mechanism is best arranged in a fashion having minimal physical size and weight in comparison to the related cutting blades and driving motor.

A broad aspect of the invention is, accordingly, to provide a light-weight, hand-held, motor- or engine-driven force-mechanism which can be fitted with shearing blades of various types, adaptable to different job applications, the arrangement consisting of: a pair of scissors blades or jaws forward, an actuating mechanism for same, a force or power converting mechanism which utilizes a threaded driving rod, the force mechanism being attached to a suitable handle, a trigger to command the operation and a motor means forming part of and mounted towards the rear of the implement.

In its more usual form this motor would be a series wound 110 volt universal electric type, and another version would employ a small two cycle gasoline engine driving through a suitable centrifugal clutch.

An object of the invention is to provide a hand-held, light-weight cutting tool, capable of individual, forceful, shearing or nipping cuts and which utilizes energy sources to power the cutting action distinct from that of the operator. The advantage here is the saving in time, reduction of fatigue and removing of the excessive strain to the muscles.

Another object is to provide a powered hand-held cutting implement in a sufficiently compact form, to give flexibility of manipulation for its various tasks. The light weight, together with a compact form, would allow the use of the tool with the arm of the operator fully extended; then the other arm and hand would be freed for the operator's self support from ladders, scaffolding or branches. The advantage here is the convenience plus safety from accidents to the operator.

These objectives are achieved because of three important innovations.

First, the device is light in weight, compact in size, and, by basic structural design, has balance incorporated into it. The fundamental design which allows the lightest and most compact form consists primarily of an electric motor, a gearing system driving a power conversion mechanism, an actuating mechanism and the cutting blades, Further, the design, mounting and location of the motor to the power conversion and actuating mechanism, together with the placement of the handle, trigger and cutting blades, can be readily adjusted to give the apparatus the required compactness, lightness and balance suitable for one hand operation.

Second, the device is light in weight because the design permits the maximum possible usage of light alloys of aluminum, magnesium or high impact plastics. The highly stressed power conversion and actuating mechanism parts which require hardened steel, are relatively small in size — the electric motor and cutting blades contributing most of the weight. Thus, the relatively light weight and compact size attained is an inherent factor in its usefulness, and is important to the uniqueness of the invention.

Third, the cutting action of the device imparts no eccentric or unbalancing forces to the operator. This factor also adds to the ease of manipulation.

Due to its powerful cutting action relative to its size and weight, therefore, the device may prove to be useful for performing many hitherto tedious tasks.

The basic form as presented here allows variations of choice in motors and gear ratios, the intended job application dictating the selection.

In accordance with a preferred embodiment of this invention, a powered cutting implement will include a pair of cutting blades having a motor powered force-mechanism to supply the necessary force during the cutting operation. The cutting blades may be in the form of scissors, which include an actuating linkage to bring about the cutting action, a forked mounting at the forward end of the implement to support the blades and enclose part of the actuating means, a tubular frame fastened to the root of the fork and fully enclosing the force-mechanism, and a gear box attached to the other end of the frame to form a combined support for the motor housing and means of attachment for the handgrip or handle; a trigger mounted on the handle, readily accessible to the operator's index finger, and a connecting mechanism from the trigger to the force-mechanism to render the latter inoperative upon the completion of one cycle; this regardless of whether the motor is energized or not. This feature ensures that the release and reactivation of the trigger will be mandatory for each and every stroke.

A simple gear train may be employed to increase the motor torque to the force-mechanism on the electric motor-powered version, but, for greater reduction, and for increased torque from a gasoline powered engine, compound gearing may be preferred. An internal combustion engine would also require a clutch means to disconnect the drive to allow the starting and idling of the engine, and can be accomplished automatically by employing a centrifugally actuated clutch. The force-mechanism may have a threaded shaft attached by a push rod to the actuating linkage, a pair of automatically operating half-nuts to engage the threaded shaft, and the half-nuts, being rotated by the motor means, for driving the threaded shaft forward.

While the latter portion of the device is similar in principle to, and is included in, the applicant's U.S. Pat. ser. No. 3,550,815, this, however, is an improved version of the automatic coupling and decoupling, wherein the half-nuts are locked in the engaged position by a ring which slides over to encircle their forward ends, and which is driven off upon completion of the power stroke. This added feature ensures reliable operation regardless of any wear on the threaded shaft or half-nuts, and also allows the employment of a square profile thread on the threaded driving shaft and the mating half-nuts. This latter feature improves the overall mechanical efficiency.

The characteristics required in a cutting implement employing a shearing or nipping action may be met by this type of coupling, the engagement of the threads taking place under zero load condition, remaining fully engaged during the entire power stroke, and the disengagement occurring with only the load of a return spring. The relatively high load on the threads while in the fully engaged position presents no serious problem, and the employment of case-hardened steel or hardened tool steel for the threaded components reduces the frictional power losses, counters any detrimental effects of the coupling or decoupling action, and can ensure a long useful life to this aspect of the device.

Incorporation of the one cycle feature in the trigger connecting mechanism may be accomplished by employing a tubular drive shaft to rotate the force-mechanism, and then extending a connecting rod from the threaded shaft through the bore of the drive shaft to engage a barrier. This barrier can then be moved aside to initiate the next cycle.

To open the cutting blades and to return the push rod, a helical spring may be employed. The inertial energy of the above mentioned action is then absorbed by a fluid escaping past piston which is installed in a tubular section of the threaded shaft. This method of absorbing the shock would only be required on larger models; on small models such as for a gardener's pruning tool, the shock can easily be handled by a short length of nylon rod, or an equivalent object replacing the hydraulic fluid.

While the electric-motor-drive version presents no problem due to overspeeding upon completion of the power stroke, the acceleration forces of the piston and connecting rod in a gasoline-engine version can overcome the structural strength of their related components and preferably should be kept under control. This can be accomplished by employing a solenoid, energized by a small alternator incorporating the ignition magneto-magnets, to interject a countermanding force into the throttle-control linkage.

The output from the type of force-mechanism as outlined in this disclosure is essentially linear in its characteristics, except for the increasing torque available from the motor driving means as a load is applied thereto. The simple toggle link mechanism gives an approximate conversion of the available force to approach that which is required to sever wood or similar fibrous materials. To sever steel bars, on the other hand, the force characteristics required are of somewhat different nature and also must be augmented. The arrangement of the blades for this purpose, as well as the necessary change in the toggle link mechanism which is required, is explained more fully in the following detailed text.

Another version of the force mechanism which has the advantage of being slightly shorter in overall length, and which may be preferred for some applications, is also explained more fully in the detailed text to follow. This version has another advantage which should prove to be useful for some applications wherein the cutting blades can be halted in their cutting action and then have a reversing force applied to open the blades. This version requires an electric motor drive means.

The objects and operations will become apparent from the following detailed description, which is to be taken in conjunction with the accompanying drawings illustrating preferred embodiments of the present invention in which:

FIG. 1 is a longitudinal partial sectional view through the axis of the implement, the forward portion above the axis being shown by dot-dash phantom lines; this being the electric powered version with the motor shown complete.

FIG. 2 is a fragmentary horizontal view of the forward section with the cutting blades and toggle linkage in the open operative position.

FIG. 3 is a fragmentary enlarged sectional view through the axis of the coupling mechanism showing the threaded half-nuts in the disengaged position.

FIG. 4 is a fragmentary enlarged sectional view through the axis of the coupling mechanism showing the threaded half-nuts engaged and locked, the locking components below the axis being shown by dotted lines.

FIG. 5 is a view of FIG. 4 showing the coupling mechanism turned axially through 90°, thereby better illustrating the locking components.

FIG. 6 is a vertical section taken on line 6—6 of FIG. 5.

FIG. 7 is a fragmentary longitudinal sectional view through the axis of the motor drive illustrating the arrangement of the gear train and the centrifugally actuated friction clutch as coupled to a two cycle internal combustion engine, the trigger coupling to the engine throttling valve, the location of the cooling fan for the engine, the location and arrangement of the means for starting the engine, the location of the ignition and angular-velocity-limiting-control magnets and their related components.

FIG. 8 is a fragmentary vertical sectional view on line 8—8 of FIG. 7 and extending forward, illustrating the ignition and throttle valve control field magnets and related components, and showing in dot-dash phantom lines, a portion of the rear components of the rotatable magnet pole pair.

FIG. 9 is a fragmentary vertical sectional view on line 9—9 of FIG. 7 illustrating the starting-cord rewind spring.

FIG. 10 is a fragmentary vertical sectional view on line 10—10 of FIG. 7 extending rearward, illustrating the starting-cord and drum and its related overrunning clutch.

FIG. 11 is a fragmentary vertical sectional view on line 11—11 of FIG. 7 illustrating the arrangement of the weighted shoes and drum of the centrifugally actuated friction clutch.

FIG. 12 is a fragmentary enlarged vertical view on line 12—12 of FIG. 8 illustrating the jet orifices through which liquid fuel passes to the engine and the throttling valve in the closed position, the throttling valve being shown in the open position by dot-dash phantom lines.

FIG. 13 is a fragmentary enlarged view of the throttling linkage and related components, the engagement of the trigger linkage with the throttling linkage being shown by dot-dash phantom lines.

FIG. 14 is a fragmentary enlarged horizontal view on line 14—14 of FIG. 13 illustrating the connecting levers and torque rod for the throttling linkage, and the bias spring with its related adjusting knob for the engine throttling control.

FIG. 15 is a perspective view of the field magnet assembly.

FIG. 16 is a schematic circuit diagram of the engine ignition circuit together with the circuit diagram of the engine angular-velocity-limiting-control.

FIG. 17 is a fragmentary longitudinal view of the forward end of the implement with certain parts broken away and removed, and which illustrates the arrangement of the cutting blades and toggle linkage members for the snipping off of steel bars.

FIG. 18 is a view of FIG. 17 showing the cutting blades turned axially through 90°.

FIG. 19 is a fragmentary sectional side elevation view of the alternate version of the force mechanism with electric motor drive, the reverse mechanism being shown in the reversed position by dot-dash phantom lines.

FIG. 20 is a circuit diagram of the electrical circuit for connecting the motor to a reversing switch as in FIG. 19.

Referring now to the drawings wherein a motorized shearing implement is illustrated, it will be observed that a pair of scissors blades 18 and 19 are mounted at the open end of a forked structure 20 by means of pivot-bolt 21 and nut 22. The rearward projections of the scissors blades are each joined by pivot-bolts 23 and 24 with nuts 25 to the toggle-links 27 and 28, they in turn being hinge-joined at their opposite ends by pivot pin 29 together with yoke 30. As can be seen by study of the action, when yoke 30 is pushed towards the pivot-bolt 21 of the scissors blades, the angle between the toggle-links is forced towards the obtuse. This action separates further the rearward extensions of the scissors blades, and as the extensions are on the same side of the hinge-bolt as their attached blades, their separation closes the cutting blades.

The thread at the rearward extremity of the yoke push-rod 31 clamps the flanged ferrule 32, the stepped washer 33, and at the same time locks onto the externally threaded shaft 34. The forked structure 20 is fastened onto the tubular frame 35 and the push-rod is made free to reciprocate in a guide-bushing provided at the joint. The resulting assembly, now firmly fastened to the push-rod, is prevented from rotating by the fit of the yoke 30, which slides between the tines of the fork 20. The conical closure 36 is free to slide axially on the body of ferrule 32 and is held against the projecting flange of the ferrule by pressure from spring 37.

The pressure from spring 38 acting on stepped washer 33 would if unrestrained, drive the push-rod assembly towards the rear. This rearward travel would permit the inclined surfaces of the conical closure 36 to close the internally threaded half-nuts 39 and 40 onto the externally threaded shaft 34. However, particularly when a square profile thread is employed, the mating position of the threads on the half-nuts and the threads of the threaded shaft is not always present; therefore, spring 37 having less tension than spring 38, will permit the conical closure 36 to remain stationary while the threaded shaft continues its backward travel; hence, the correct position is reached and pressure from spring 37 on the conical closure 36 clamps the two half-nuts 39 and 40 onto the threaded shaft 34. The closure of the two half-nuts will now permit the pressure of spring 41, enclosed in tubular part 42, to slide the locking ring 43 which is attached to part 42 over the forward ends of the half-nuts; thus, locking them in the closed position. Ring 43 is attached to tubular part 42 by the two members 44 and 45 which pass by on either side of the half-nuts 39 and 40. The half-nuts will remain locked in the closed position until rotation of the half-nuts by their cage 46 moves the threaded shaft 34 forward and brings the trip 47 to bear against the rear of part 42 driving it and the attached locking ring 43 forward. The forward tubular section of part 42 also contains the conical-ended, flanged sleeve 48 which by a wedging action separates the two half-nuts 39 and 40, the flange on sleeve 48 having been engaged by the tubular section of part 42. Subsequently the half-nuts 39 and 40 now being separated, they remain so by pressure from spring 41 on the conical-ended sleeve 48.

The torque from the electric motor 49 is transmitted by the pinion gear 50 through gear 51 to the tubular shaft 52 which is mounted in the combination thrust and radial bearing 53 and radial bearing 57. The grooved half-nuts radial-support seat washer 54 and the slotted half-nuts circumferential-support washer 55 is clamped into the half-nuts cage 46 by means of the thread on the forward end of the shaft 62. Sufficient clearance is allowed between the bottom of the groove in the seat-washer 54 and the bottom of the slot in the washer 55 to allow the threaded ends of the two half-nuts 39 and 40 to swivel radially inward and outward.

Turning our attention again t' trip to a rod 56 mounted therein, and extending rearwardly beyond the bearing 57, bears up against the full cross-sectional portion of the notched sear 58; thus, arresting the full backward movement of the push-rod assembly. Now when the trigger 59 is pulled, it swivels about pin 60, pushing by means of pin 61, the linkage 62 upwards. The linkage engages the sear 58 and by driving it upwards permits the rearward end of rod 56 to fall into the notch 58' in sear 58. Pressure from spring 38 now drives the push-rod assembly backward which initiates the closure and locking of the half-nuts 39 and 40 onto the threaded shaft 34 as previously outlined. A further travel of the trigger, and by means of ramp 62' on linkage 62 bearing against pin 63, swivels the top end of linkage 62 clear of sear 58, and thereby permits sear 58 to be returned to its arresting position by pressure from spring 64.

The further travel of the trigger then closes, by means of pin 65 and spring 66, the contacts on the electrical switch 67 which are mounted inside the handle 68. This energizes the electric motor 49. The power stroke and return stroke now take place whereupon the push-rod assembly is again arrested in its full backward travel by means of the previously repositioned sear 58. Consequently, the trigger 59 must be released by the operator and again pressed in order to initiate another cycle. The spring 72 returns the trigger and the linkage 62 to the starting position.

The inertial energy of the returning push-rod assembly is cushioned by the nylon rod 69 which is mounted in a cavity provided in the threaded driving shaft 34, the blow being transmitted by the rod 56. On larger models of the implement, the cavity in the threaded shaft would be partially filled with oil and the rod 56 and trip 47 would have a fitted oil seal. The rod 56 being restrained in its forward movement by the inner sleeve 71, would resist the backward motion as the push-rod assembly is driven backward and the energy would be absorbed in part, by the agitation of the oil escaping around piston 70.

The trigger action of the internal combustion engine version is similar to that already outlined with the exception that as the trigger 59 is pulled further back, the increased travel of the trigger, by pushing linkage 62 upward, the latter, after releasing the sear 58, now engages the forward end of lever 73 driving it upward. This motion is transferred by torque rod 74 across the body section 75 to lever 76 and then by the pressure of spring 77 and the friction between the contacting surfaces of lever 76 with lever 78, to lever 78. The downward motion of lever 78, acting through the connecting linkage 79, pulls the throttle lever 80 downward, thereby, rotating the butterfly valve diaphragm 81 to the horizontal.

The internal combustion engine model differs in its operating requirements from that of the electric powered version in that the engine 82 must first be put into a running or idling condition before any cutting is attempted. This is done with the aid of the starting handle 83 attached to starting cord 84, the latter being wound several times around the drum 85. A pull on the cord, and the subsequent unwinding of the cord 84 from drum 85, rotates the drum about its pivotal support. This support is an integral part of the forward crankcase cover 115. The torque from drum 85 is transmitted by the attached inner ring 87 of an overrunning ball clutch to the outer ring 88, then, by way of flanged disk 89, which is clamped to the crankshaft by nut 96 to the crankshaft 95. The rotation of drum 85 also winds up the flat spiral spring 86, consequently, the release of the handle 83 permits the rewinding of cord 84 onto drum 85.

Attached to the flanged disk 89, on the forward side, are pole pieces 90 and 91, and two magnets 92 and 93; the latter are interposed between the pole pieces and are polarized similarly fore and aft. The arrangement of the pole pieces 90 and 91 and the two magnets 92 and 93, being attached to the crankshaft 95 by disk 89, results in a four pole rotatable magnet, rotating in unison with the crankshaft. The foregoing assembly is clamped together with the aid of four rivets and disk 94 and consequently also rotate with the crankshaft.

Firmly attached to disk 94 are two pivot pins 97 each supporting weighted clutch shoes 98; the clutch shoes being forced inward by pressure from springs 99 acting outward on their integrally attached mountings, the latter being on the opposite side of the pivot pins. The springs 99 react on their inward ends against a forward tubular projection integral with disk 94. The clutch shoes 98, together with the clutch drum 100, combine to make an overrunning centrifugal clutch with the engagement angular velocity being determined by predetermined pressure of springs 99. The drum 100 is rotatably mounted by bearing 102 and is stabilized by the forward section of crankshaft 95 projecting into the tubular section 101, and being free to rotate therein. Tubular section 101 is integral with drum 100 and has fixed thereon pinion gear 103. At high angular velocities, the clutch shoes 98 engage the drum 100, consequently the crankshaft 95 turns in unison with tubular section 101 in bearing 102. The torque from the crankshaft is then transmitted through gear 103 to gear 104 and 105 to gear 51.

With the engine 82 having been started and then idling at a low rate, actuation of the trigger 59 permits the engagement of the half-nuts 39 and 40 onto the threaded shaft 34 as previously outlined, then sequentially later, the diaphragm 81 is rotated. Because this diaphragm is the throttling valve of the engine, the engine now accelerates to maximum angular velocity and the centrifugal clutch engages. The cutting stroke now takes place and completes one cycle as outlined for the electric powered version. However, upon completion of the cutting stroke, in the gasoline powered version, the throttle-valve would now be wide open and there would be a tendency for the engine to accelerate to very high angular velocities, an undesirable condition for many reasons and which should be kept under control. This is accomplished with solenoid coil 104, its core 105, alternator coil 106 and alternator core 107, together with rectifier 108 and Zener diode 108Z operating in the following manner.

When the connecting linkage 79 is pulled downward to open the throttle diaphragm 81, the attached solenoid core 105 is withdrawn partially from solenoid coil 104. At a predetermined angular velocity of the crankshaft, the alternating voltage induced in coil 106 is rectified by diode 108 and exceeds the threshold voltage of Zener diode 108Z. The resulting current then flows through the solenoid coil 104, acts on core 105, against the pressure of spring 77 to pull upward the connecting linkage 79 and close the throttle diaphragm 81. The current limiting resistor 124 protects the Zener diode. The effect of spring 77 can be adjusted by pressing inward on knob 109, then turning it anti-clockwise to increase or clockwise to reduce the bias pressure and then withdrawing the knob. The axial pressure of spring 77 on lever arm 78 gives frictional drive to the contacting surfaces of levers 78 and 76 and assists to dampen out any undesirable hunting effects.

Ignition for the engine is provided by the magneto made up of the previously mentioned magnet assembly, magneto core 109, primary and secondary coil 110, and ignition points assembly 111. Cooling air for the engine is provided by the blower fan 112, drawing air inward at its center and blowing it over the engine cylinder 113 with the aid of duct-cover 114.

As will be appreciated by those familiar with the art of internal combustion engines and their related liquid fuel dispensers, the sudden opening of a throttle diaphragm can lead to a momentary lack of fuel and a resultant stall of the engine. One reason for this is the time lag before the fuel reaches the high speed or running jet. Normally this jet is located on the atmospheric side of the throttle diaphragm and, therefore, when the diaphragm is nearly closed it has very little vacuum from the engine to raise the fuel level; the latter would be close to or at the level of the fuel in the float chamber. To overcome this part of the problem, the high speed jet orifice 117 is incorporated with the low speed or idling jet orifice 118, and have a common opening 119 leading to the fuel supply. The high speed jet orifice 117 now acts as the air bleeder supply to the low speed jet orifice 118 under closed throttle conditions. As the fuel supply is now at a high level and close to the intake manifold in both jets, it is more quickly available at the instant of throttle opening.

The fuel requirements are adjusted for optimum open throttle performance by the inner needle valve 120. However, with the diaphragm 81 in the closed position, orifice 118, being under the influence of the engine intake vacuum, would supply the fuel in excessive quantities. This is reduced by orifice 117 now acting as an air bleeder supply inlet for orifice 118, the amount of air can be adjusted by the setting of valve 121. The leaf springs 122 and 123 lock the adjustments in place.

The engine crankcase, clutch and magnet housing, and gear box housing are clamped together at four corners by four bolts 116.

The implement support handle 68 is fastened to the gear box housing by two bolts 117.

The cutting characteristics of the implement as hereto described are well suited for use in pruning trees or for cutting rod-like substances of a similar nature. Here the requirements of the cutting force, applied at the blades, increase in magnitude as the blades penetrate more deeply into the wood and reach a maximum just before the complete severance occurs. This is not the case, however, for the shearing or nipping through steel bars. The cutting force available as the blades first enter the metal should be at a relatively high level, then increasing as the blades penetrate more deeply and dropping suddenly to a very low level as the metal separates in a tensile fracture. To achieve the cutting force characteristics most suited for this application, a modification of the linkage mechanism is required and is accomplished as illustrated in FIGS. 17 and 18 wherein the two cutting blades 125 and 126 are linked together with straps 127 and 128 and pivot-bolts 129 and 130. The rearward extensions of the cutting blades are then pivotally connected to the lever members 131 and 132 by pivot-pins 133 and 134 with the lever members in turn being individually pivotally mounted onto the forklike mounting 135 by means of pivot-bolts 136 and 137. The rearward extensions of the lever members are joined by pivot-bolts 138 and 139 to the toggle-links 140 and 141, and as they, in turn, are hinge-joined at their opposite ends by pivot-pin 142, together with yoke 143, on the end of push rod 144. This part of the implement, that is the toggle links and the push rod assembly, is identical to that already described for the previous model with the operating principle being the same.

With this arrangement of the cutting blades, however, because the rearwardly projecting extensions of the cutting blades with pivot-bolts 133 and 134 are at a location axially inward from the location of the pivot-bolts 136 and 137 of the lever members, the action of this portion of the device will give a maximum nipping force when the cutting blades are in the fully opened position. The situation counteracts the characteristics of the action of the toggle links 140 and 141 which at this time is at a minimum. The resultant force of this combination of the two actions as described, approaches to some extent, that which is required in the cutting of steel bars; and with the multiplication of forces achieved by the lever members, and combined with a longer length of stroke in the force mechanism, the device can be adapted to the cutting of steel bars while remaining in a reasonably compact form.

FIG. 19 with the circuit diagram in FIG. 20 illustrates a modified version of the force mechanism. While this version requires reversibility of the motor drive which can best be accomplished with an electric motor as the power means, and also is slower in its overall operating cycle, it does have the added feature of reversal of the cutting stroke at any portion thereof.

The physical form is very similar to that which has been described for the previous electric powered version, the principle change being the use of a one piece driving nut 146 replacing the two half-nuts as outlined previously. To reverse the direction of travel of the threaded shaft 147 and the push rod 148, the direction of rotation of the armature and driving shaft of the electric motor 149 is reversed. This is accomplished by the double pole, double throw, toggle switch 150 which is electrically connected to the electric motor in a manner to reverse the direction of electric current flow through the motor armature windings relative to that flowing in the motor field windings. The operational lever of toggle switch 150 is actuated by the resilient connecting linkage member 151, which, being attached to the lever member 152, is in turn actuated by the connecting member 153 which is partially enclosed by the threaded shaft 147. Connecting member 153 is driven forward or backward the short distance required to actuate the toggle switch 150 by means of the guiding bushing 154, which, being attached to the rearward end of shaft 147, bears against the collar 155 attached to the forward end of the connecting member 153 and reverses the drive to open the cutting blades, and subsequently bears against collar 156 to again reverse the drive in the other direction thereby to drive the threaded shaft 147 forward on the cutting stroke. The electric motor is energized by the trigger member 157 acting on leaf-spring 158 to trip the micro-switch 159. An additional lever member 160 is pivotally mounted with the trigger member 158 on a common pivot-pin 161, and is pushed by a reverse motion of the trigger 158 to bear against the lever member 152, thereby to also actuate the toggle switch 150. This latter capability is possible after the threaded shaft has travelled a portion of the forward stroke; following this, reenergizing the electric motor by the trigger results in a reopening of the cutting blades.

The invention as herein described is particularly adapted to sever rod-like or bars of material, however the blades may be shaped to shear heavy gauge sheet metal — the latter version of the force mechanism being suitable for this application because the opening of the cutting blades is motor powered and can open against some resistance.

From the foregoing description, the nature and advantages of the present invention will be apparent. Many modifications obviously can be made in construction and arrangement within the scope of the invention as defined in the appended claims.

The embodiments of the invention in which an exclusive property or privilege is claimed are defined as follows;

1. A motorized shearing implement for cutting rod-like material, comprising:
   a pair of cutting blades arranged to cut with a shearing or nipping action;
   a frame having a hand grip attached thereon for supporting the implement during use;
   an actuating means for said blades having incorporated therein a toggle link pair within a forklike mounting extending forwardly from said frame;
   a connecting member operatively connected to said toggle link pair for closing and opening said blades and being operable to reciprocate in an axial sense;
   a guiding support for said connecting member installed rearwardly from the fork of said mounting and extending therefrom to a cylindrical bore in said frame;
   a force-mechanism mounted within said frame at a location rearwardly of said actuating means and employing a screw thread for converting rotary to linear motion;
   a motor means including a drive means for said force-mechanism mounted rearwardly of said force-mechanism on said frame and operable to apply axial force to said connecting member;
   said force-mechanism having an outer member operatively coupled to said motor means for rotation thereby and having an inner member joined to said connecting member, and
   an operative means coupled to said inner member for effecting the motor drive from said outer member to said inner member and being operable to reverse the axial motion of said inner member in either direction after a predetermined distance of travel thereof, and
   said drive means includes a rotatable tubular drive shaft connected to said force-mechanism and arranged so that said inner member on its rearward excursion retracts rearwardly into the bore of said shaft, and including a reciprocally mounted rod located within an axial hole in said inner member and extending rearwardly beyond said tubular drive shaft; said rod being operationally linked to a triggering means for overriding the action of said operative means to effect the axial motion of said member.

2. A motorized shearing implement as claimed in claim 1, wherein said blades are pivotally supported on said forklike mounting and have rearwardly projecting extensions individually pivotally connected to each end of said toggle link pair.

3. A motorized shearing implement as claimed in claim 22, wherein said blades are pivotally joined together to cut at their forward ends and have rearwardly projecting extensions individually pivotally connected to each one of a pair of lever members; and said lever members being individually pivotally connected to each end of said toggle link pair and individually pivotally supported on said forklike mounting at a location transversely outward of the pivotal connections of said blades to said lever members.

4. A motorized shearing implement as claimed in claim 1, wherein said force-mechanism is a releasable coupling having threaded half-nuts releasably drivingly engageable with a mating thread on said inner member for pushing said connecting member forwardly, and includes a spring means for urging said connecting member rearwardly, and also includes an actuating means for engaging said half-nuts to said mating thread, comprising in combination: said half-nuts having segmental conical surfaces included on one end, a clamping member surrounding said inner member at one end thereof and being reciprocally mounted thereon, a resilient means urging said clamping member toward said conical surfaces relative to said inner member, and said clamping member having a conical bore confronting said conical surfaces thereby to engage and force said half-nuts radially inwardly to engage said half-nuts drivingly with said mating thread on said inner member upon the return of said connecting member by said spring means; and including a stop secured to said inner member for disengaging said half-nuts from said mating thread after a predetermined distance of travel by said inner member.

5. A motorized shearing implement as claimed in claim 1, wherein said force-mechanism is a releasable coupling surrounding said inner member, and said releasable coupling has embodied therein threaded half-nuts being releasably drivingly engageable with a mating thread on said inner member for pushing said connecting member forwardly; and includes a spring means for urging said connecting member rearwardly.

6. A motorized shearing implement as claimed in claim 1, wherein said force-mechanism includes a releasable coupling comprising a tubular body-member having a structural support disposed within and in fixed relation thereof, and having threaded half-nuts arranged within said body-member in a manner whereby the rearward ends of said half-nuts are circumferentially and radially anchored by said support while the forward ends are free to swivel radially inward and operable to effect a driving engagement with a mating thread on said inner member, and embodied within said body-member is a means for locking said half-nuts in the engaged position, comprising in combination a ring surrounding the forward ends of said half-nuts being operatively connected by at least one rigid member to a tubular member which is located rearwardly of said half-nuts, a sleeve located rearwardly of and bearing against said half-nuts and mounted reciprocally in the bore of said tubular member, and a spring means within said tubular member operable to apply forward pressure to said sleeve and rearward pressure to said tubular member and operable to slide said ring over a mating diameter on said half-nuts when the latter are drivingly engaged; and, by a forward motion relative to said half-nuts, said tubular member is operable to slide said ring off said mating diameter and subsequently to engage said sleeve and said sleeve having a conical surface on the end thereof confronting a segmental conical bore in said half-nuts to force the latter radially outwardly to disengage said half-nuts from said mating thread.

7. A motorized shearing implement as claimed in claim 1, wherein a decelerating means for said inner member is operationally linked to said triggering means and comprises a resilient material installed within the bore of said axial hole in said inner member, and said reciprocally mounted rod being operable simultaneously to engage said resilient material and said triggering means, thereby to effect a decelerated arrest of the rearward motion of said inner member.

8. A motorized shearing implement as claimed in claim 1, wherein said triggering means comprises in combination a pivotally mounted trigger, a moveable barrier mounted in said frame athwart the axis of said reciprocally mounted rod and operable to be engaged by said rod, and said trigger having pivotally mounted thereon a linkage means operable by a motion of said trigger to engage and shift said barrier and subsequently to disengage therefrom; and said barrier having spring means installed thereon to effect a return shift thereof.

9. A motorized shearing implement as claimed in claim 1, wherein said motor means includes an electric motor having said triggering means manually selectively operable to energize said motor; and the output-shaft os said motor being coupled to said drive means through an augmentative torque means for driving said force-mechanism.

10. A motorized shearing implement as claimed in claim 1, wherein said motor means is an electric motor with an electrical switching, means comprising a ferrule affixed to the rearward end of the bore in said axial hole in said inner member, a stop on each end of said reciprocally mounted rod being sequentially operable to engage said ferrule thereby to drive said rod forwardly or rearwardly a short distance at the most forward or most rearward excursion of said inner member, and said rod being operatively connected by a linkage means to an electrical switch which is electrically connected in a manner to reverse the direction of rotation of said motor in either direction.

11. A motorized shearing implement as claimed in claim 1, wherein said motor means includes an electric motor energized by a trigger incorporated within said triggering means, an electrical switch electrically connected to said motor and operable to reverse the direction of rotation of said motor in either direction, a lever member pivotally mounted on said frame, one end of said lever member being pivotally connected to said reciprocally mounted rod and the opposite end linked to said switch so that an axial movement of said rod by said inner member in either direction will actuate said switch to reverse the direction of rotation of said motor; and an additional linkage member being disposed within said handle in a manner whereby a reverse motion of said trigger will cause said additional linkage member to engage said lever member and override the action of said rod.

12. A motorized shearing implement as claimed in claim 1, wherein said motor means includes an internal combustion engine having said triggering means manually selectively operable to actuate a connecting linkage to a throttling valve for controlling the air-intake to said engine, and said connecting linkage having incorporated therein an electro-magnetic and resilient mechanical means wherein an electro-magnetic mechanical force acts in opposition to the mechanical resilience; and the said electro-magnetic force being determined by the angular velocity of the output-shaft of said engine and biased for limiting the actuation of said connecting linkage.

13. A motorized shearing implement as claimed in claim 1, wherein said motor means includes an internal combustion engine having a carburetion means comprising in combination: an air duct having installed therein a rotatable diaphragm to control the flow of air admitted to said engine, a passageway to a fuel-reservoir having an enlarged orifice connected thereto and in concentric relationship thereof with an opening to said duct, a branch orifice intersecting said enlarged orifice with an opening to said duct being located away from the atmospheric side of said enlarged orifice, an adjustable concentric valve-assembly mounted in coaxial alignment to said passageway and having a tubular member with a rod in the bore of said member passing through said enlarged orifice, said rod having a conical end thereon penetrating said passageway for restricting the flow of fuel therefrom, and said tubular member having a conical end thereon penetrating said enlarged orifice for restricting the flow of air therein; and said diaphragm being so constructed and pivoted to interpose between said enlarged orifice and said branch orifice to isolate the latter from normal atmospheric pressure when said diaphragm is in the closed or throttling position.

14. A motorized shearing implement as claimed in claim 1, wherein said motor means includes an internal combustion engine having the output-shaft of said engine coupled to said drive means through a centrifugally actuated friction clutch and an augmentative torque means, said clutch comprising in combination: a drum supported by a tubular shaft on a pivotal mount and having a peripheral rim projecting rearward therefrom, said tubular shaft extending forwardly through said pivotal mount and having the driving member of said torque means affixed forwardly thereon, said engine output-shaft rotatably mounted within the bore of said tubular shaft for mutual support thereof, two weighted friction shoes being surrounded by said rim and pivotally mounted on a disk which is affixed to said output-shaft and having the pivot-point on said shoes located well to one side of the center-of-mass thereof, and spring means mounted on lever arms which are attached to said shoes on the side opposite the pivot-point of said center-of-mass for urging said shoes to swivel radially inward thereby, therefore when said output-shaft is rotated beyond a predetermined angular velocity, the weight on said shoes will overcome said spring means and force said shoes into frictional driving engagement with said rim.

15. A motorized shearing implement as claimed in claim 1, wherein said motor means includes an internal combustion engine, comprising in combination a crankshaft operatively connected to an internal combustion chamber and enclosed within a crankcase, a fan attached to the rearward extremity of said crankshaft and operable to blow cooling air over said combustion chamber, a manually actuated cranking means operationally coupled to said crankshaft and mounted on the forward end of said crankcase, an electric current-interrupter means located rearward of said crankcase and mounted thereon, a rotatable magnetic means mounted on said crankshaft at a location forward of said cranking means, an electro-magnetic coil means fastened to said crankcase at a location adjacent said magnetic means and being magnetically coupled to said magnetic means and electrically connected to said interrupter means to provide ignition for said engine, and an electro-magnetic coil means being magnetically coupled to said magnetic means and electrically connected to a throttling control incorporated within said triggering means to effect the actuation thereof.

16. A motorized shearing implement as claimed in claim 15, wherein said magnetic means comprises: two ferro-magnetic disks having a hole of an enlarged diameter relative to the diameter of said crankshaft constructed coaxially in each disk and attached coaxially to said crankshaft by means of a non-magnetic material, two or more integral pole-members projecting radially outward from each of said disks and having one or more permanently magnetized magnetic-members interposed between said disks, and the magnetic polarity of said magnetic-members being similarly polarized along the axis of said crankshaft for inducing magnetic polarity to said pole-members.

17. A motorized shearing implement as claimed in claim 1, wherein said force-mechanism comprises an internally threaded means releasably drivingly engageable with an externally threaded shaft for converting rotary motion from said motor means to linear motion and operable to force axially in one direction said connecting member, and a spring means coupled to said connecting member and operative to return said connecting member upon release of said internally threaded means from engagement with said externally threaded shaft; and includes an actuating means operable to disengage said internally threaded means from driving engagement with said externally threaded shaft after a predetermined distance of travel of said connecting member in said one direction, and said actuating means operable to engage said internally threaded means for driving engagement with said externally threaded shaft upon the return by said spring means of said connecting member in a direction opposite to said one direction.

* * * * *